US007603617B2

(12) United States Patent  
Henning et al.

(10) Patent No.: US 7,603,617 B2  
(45) Date of Patent: Oct. 13, 2009

(54) INTERACTIVE HYPERLINK SELECTION AND DIAGRAMMING

(75) Inventors: Shawn Patrick Henning, Seattle, WA (US); Jason Churchill Costa, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 171 days.

(21) Appl. No.: 10/822,312

(22) Filed: Apr. 12, 2004

(65) Prior Publication Data

US 2005/0229167 A1 Oct. 13, 2005

(51) Int. Cl.  
*G06F 17/00* (2006.01)

(52) U.S. Cl. .................................. 715/206; 715/207

(58) Field of Classification Search .............. 715/514, 715/206, 207  
See application file for complete search history.

(56) References Cited

U.S. PATENT DOCUMENTS

| | | | | |
|---|---|---|---|---|
| 5,870,767 A * | 2/1999 | Kraft, IV | ................. | 715/501.1 |
| 6,035,330 A * | 3/2000 | Astiz et al. | ................. | 709/218 |
| 6,037,935 A * | 3/2000 | Bates et al. | ................. | 715/760 |
| 6,199,071 B1 * | 3/2001 | Nielsen | ................. | 707/204 |
| 6,282,545 B1 * | 8/2001 | Coats | ................. | 707/102 |
| 6,389,409 B1 * | 5/2002 | Horovitz et al. | ................. | 707/2 |
| 6,925,496 B1 * | 8/2005 | Ingram et al. | ................. | 709/224 |
| 7,000,186 B1 * | 2/2006 | Gropper et al. | ................. | 715/537 |
| 2005/0028081 A1 * | 2/2005 | Arcuri et al. | ................. | 715/501.1 |

* cited by examiner

*Primary Examiner*—Rachna S Desai  
(74) *Attorney, Agent, or Firm*—Merchant & Gould; Ryan T Grace

(57) ABSTRACT

Methods and systems provide for automatically diagramming a web site and associated web pages and links based on interactive navigation and selection performed by a user. Through interactive hyperlink selection and diagramming, a web site diagram is constructed that is based upon the web pages and links selected by a user while the user is traversing or navigating the web site starting at any given point within the web site. The diagram may be prepared so that only user-selected web pages and/or links are mapped and diagrammed, or all web pages and/or links at any traversed discovery level of the web site may be mapped and diagrammed. One automatically mapped portion of a selected website may be "bridged" to a second automatically mapped portion of the selected website, where user input allows for selection of the different portions of the web site to be automatically mapped.

21 Claims, 8 Drawing Sheets

US 7,603,617 B2

INTERACTIVE HYPERLINK SELECTION AND DIAGRAMMING

FIELD OF THE INVENTION

The present invention generally relates to mapping and diagramming the structure of Internet-based web sites. More particularly, the present invention relates to interactive hyperlink selection and diagramming.

BACKGROUND OF THE INVENTION

With the advent of distributed computing environments, such as the Internet, users have become accustomed to navigating through a variety of useful information sites. With the Internet, users may navigate through countless web sites. Once in a particular web site, a user may navigate through a variety of individual web pages contained in the web site, and the user may navigate through a variety of links to other web sites and other web pages imbedded in a given web site or web page. Because of the vast number of web pages and web site links that may be associated with a given web site, the overall structure of the web site may become a maze of pages and links that is difficult to understand and to navigate. This is particularly a problem when a given user is only interested in a specific navigation path that leads the user through certain pages and/or links with a given web site.

Methods have been developed for automatically diagramming a selected web site and its associated web pages and links so that a user may review a diagrammatic structure of the web site to assist the user in understanding the structure of the web site and to assist the user in subsequent navigation of the web site. Unfortunately, such automatic systems are limited to diagramming only those portions of a site that can be accessed without user interaction. For example, an automated web site diagramming system cannot navigate through a page or link requiring user input, such as a password, or user selection, such as selection or entry of a search term. If a diagram of such areas of a web site is needed by a user, then the automated diagram is of little use to the user. For example, the user may navigate a web site of a book ordering company. The particular search path used by the user for finding books of interest may require input of search terms at many levels of searching. A mapping and diagramming of the general web site structure without a mapping and diagramming of the search path followed by the user is not very useful to the user. In addition, such systems often diagram a web site according to a wider scope than is needed by the user. Such systems typically follow every web page and link that may be parsed without user interaction and are only limited by the number of links and the depth of path specified by the user. Unfortunately, the resultant diagram may give the user information that is neither required nor useful.

It is with respect to these and other considerations that the present invention has been made.

SUMMARY OF THE INVENTION

Embodiments of the present invention solve the above and other problems by providing methods and systems for automatically diagramming a web site and associated web pages and links based on interactive navigation and selection performed by a user. Through interactive hyperlink selection and diagramming of the present invention, a web site diagram is constructed that is based upon the web pages and links selected by a user while the user is traversing or navigating the web site starting at any given point within the web site. The diagram may be prepared so that only user-selected web pages and/or links are mapped and diagrammed, or all web pages and/or links at each traversed level of the web site may be mapped and diagrammed.

More particularly, according to aspects of the invention, a user launches a web diagramming application for diagramming selected portions of a web site. The user provides the web diagramming application a starting point, such as a starting web site address or web page address. The web diagramming application automatically creates and displays a diagram of the web site from the starting point provided by the user. A portion of the displayed diagram may then be selected as a starting point for interactive hyperlink selection and diagramming.

Upon selection of a portion of the displayed diagram as a starting point, the web diagramming application launches a hosted web browser control (program) to allow the user to interactively navigate through selective portions of the web site in a similar manner as the user would normally navigate through the web site using a web browsing application. The user may select web pages, select links, enter search terms, provide authentication information, and the like in order to navigate to those web pages and/or links of the web site that are of interest to the user.

While the user is navigating the web site, the hosting web diagramming application builds a data structure for mapping each site, page or link navigated to by the user. For each discovery (navigation) level traversed by the user, only those pages or links selected by the user may be mapped to the data structure. Alternatively, all pages and links at each discovery level traversed by the user may be mapped to the data structure. When the interactive navigation and mapping session is closed, the web diagramming application, using the data structure, creates and displays a diagram showing the web site, web pages and links selected by the user during navigation. Thus, the user receives a mapping of a web site that is tailored to the user's navigation through the web site.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention as claimed.

DETAILED DESCRIPTION

As briefly described above, embodiments of the present invention are directed to methods and systems for automatically diagramming a web site and associated web pages and links based on interactive navigation and selection performed by a user. Methods and systems of the present invention allow users to trace the route they take while browsing a web site and map the route in the form of a diagram which represents the structure of the web site and the particular portions of the web site navigated by the user. Methods and systems of the present invention also allow for a "bridging" between one automatically mapped portion of a selected website and a second automatically mapped portion of the selected website, where user input allows for selection of the different portions of the website to be automatically mapped. In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense and the scope of the present invention is defined by the appended claims and their equivalents.

Figure 1:
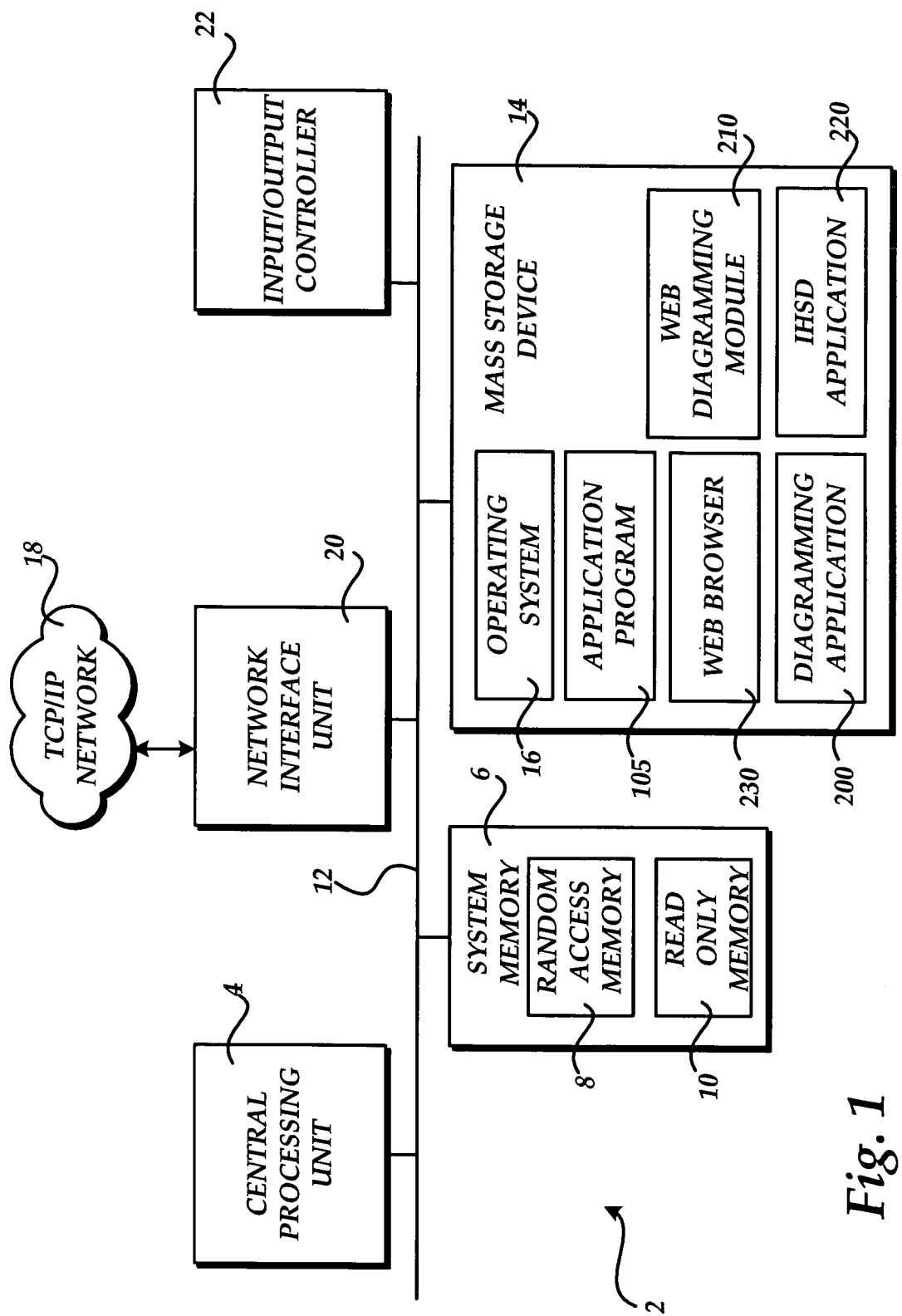
FIG. 1 is a block diagram showing the architecture of a personal computer that provides an illustrative operating environment for embodiments of the present invention.

Referring now to the drawings, in which like numerals represent like elements through the several figures, aspects of the present invention and the exemplary operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for a personal computer 2 for practicing the various embodiments of the invention will be described. The computer architecture shown in FIG. 1 illustrates a conventional personal computer, including a central processing unit 4 ("CPU"), a system memory 6, including a random access memory 8 ("RAM") and a read-only memory ("ROM") 10, and a system bus 12 that couples the memory to the CPU 4. A basic input/output system containing the basic routines that help to transfer information between elements within the computer, such as during startup, is stored in the ROM 10. The personal computer 2 further includes a mass storage device 14 for storing an operating system 16, application programs, such as the application program 205, and data.

The mass storage device 14 is connected to the CPU 4 through a mass storage controller (not shown) connected to the bus 12. The mass storage device 14 and its associated computer-readable media, provide non-volatile storage for the personal computer 2. Although the description of computer-readable media contained herein refers to a mass storage device, such as a hard disk or CD-ROM drive, it should be appreciated by those skilled in the art that computer-readable media can be any available media that can be accessed by the personal computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the personal computer 2 may operate in a networked environment using logical connections to remote computers through a TCP/IP network 18, such as the Internet. The personal computer 2 may connect to the TCP/IP network 18 through a network interface unit 20 connected to the bus 12. It should be appreciated that the network interface unit 20 may also be utilized to connect to other types of networks and remote computer systems. The personal computer 2 may also include an input/output controller 22 for receiving and processing input from a number of devices, including a keyboard or mouse (not shown). Similarly, an input/output controller 22 may provide output to a display screen, a printer, or other type of output device.

As mentioned briefly above, a number of program modules and data files may be stored in the mass storage device 14 and RAM 8 of the personal computer 2, including an operating system 16 suitable for controlling the operation of a networked personal computer, such as the WINDOWS operating systems from Microsoft Corporation of Redmond, Wash. The mass storage device 14 and RAM 8 may also store one or more application programs. In particular, the mass storage device 14 and RAM 8 may store an application program 105 for creating and editing an electronic document or for providing some other useful functionality. For instance, according to embodiments of the present invention, the application program 105 may comprise a diagramming application 200 as described with reference to FIG. 2 below. Other applications illustrated in FIG. 1 and applicable to embodiments of the present invention include the web diagramming module 210, the interactive hyperlink and diagramming (IHSD) application 220 and the web browser control 230.

Figure 2:
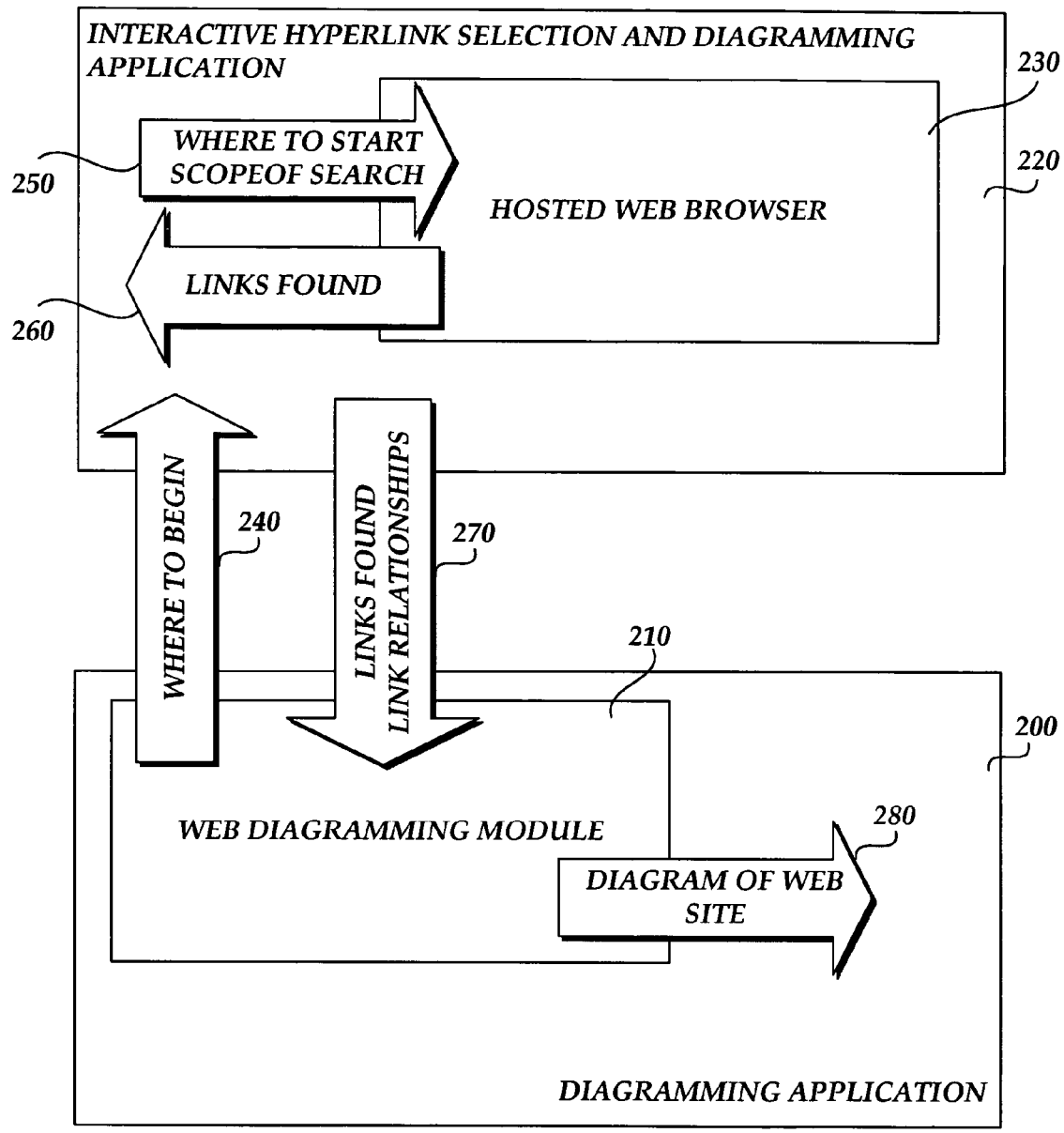
FIG. 2 is a simplified block diagram illustrating interaction between an interactive hyperlink selection and diagramming application and a diagramming application according to embodiments of the present invention.

FIG. 2 is a simplified block diagram illustrating interaction between an interactive hyperlink selection and diagramming application and a diagramming application according to embodiments of the present invention. As shown in FIG. 2, a diagramming application 200 is illustrated for creating and displaying a diagram of web sites, web pages and hyperlinks selectively traversed by a user according to embodiments of the present invention. An exemplary diagramming application 200 for use with embodiments of the present invention includes VISIO manufactured by Microsoft Corporation of Redmond, Wash. As should be understood by those skilled in the art, the present invention may be practiced with any number of diagramming applications capable of creating and displaying diagrammatic images as described herein.

A web diagramming module (application) 210 is illustrated in association with the diagramming application 200. According to embodiments of the present invention, the web diagramming module 210 is a software program including sufficient computer executable instructions for diagramming web site structure as described herein. According to embodiments of the present invention, the web diagramming module 210 may be used to automatically parse a given web site including web pages and hyperlinks contained therein and for building a data structure associated with each web site, web page, and embedded hyperlink from which a displayable diagram of the web site structure may be prepared. An example web diagramming module 210 includes a software module included in VISIO manufactured by Microsoft Corporation of Redmond, Wash. Operation of web diagramming applications 200 and web diagramming modules 210, such as provided by VISIO, manufactured by Microsoft Corporation of Redmond, Wash., for diagramming the structure of a web site including the relationships between web pages and links contained therein is well known to those skilled in the art.

According to embodiments of the present invention, as the user selects pages and/or links of a given web site that have been mapped by the web diagramming module 210, each page and/or link selected by the user is stored by the web diagramming module 210 in a persisted data structure. Any relationships between the selected sites, pages and/or links are also stored by the web diagramming module 210 in the persisted data structure. Portions of a given website selected by the user are automatically mapped by the web diagramming module 210, and one automatically mapped portion of a selected website is "bridged" to a second automatically mapped portion of the selected website. Subsequently, the diagramming application 200 utilizes the data structure created by the web diagramming module 210 to create and display a diagram of the web site, web pages, and links selected by the user Referring still to FIG. 2, an interactive hyperlink selection and diagramming (IHSD) application 220 is illustrated in association with the diagramming application 200. According to embodiments of the present invention, the interactive hyperlink selection and diagramming application 220 hosts a web browser control application 230 for allowing a user to select a desired web site, web page, or web link for interacting therewith. The hosted web browser control 230 includes sufficient computer executable instructions for allowing a user to traverse an Internet-based web site and web pages and hyperlinks contained therein in a similar fashion as the user would navigate an Internet-based web site using a typical web browsing application, such as Internet Explorer manufactured by Microsoft Corporation of Redmond, Wash. That is, the user may navigate from one web page to another, select embedded hyperlinks to navigate to an associated site or page, enter data such as authentication information and search terms and the like. As should be appreciated by those skilled in the art, the interactive hyperlink selection and diagramming application 220 along with the hosted web browser control 230 may be provided as integrated software modules of the diagramming application 200. Alternatively, the interactive hyperlink selection and diagramming application 220 and the hosted web browser control may operate remotely from the diagramming application 200, but may be called upon by the diagramming application 200 for required functionality.

According to embodiments of the present invention, a user of the diagramming application 200 launches the web diagramming module 210 and provides the interactive hyperlink selection and diagramming application 200 a starting point at a particular web site or at a particular web page or hyperlink within a given web site for beginning an interactive hyperlink selection and diagramming session. The arrow 240, illustrated in FIG. 2, represents input from the user to the interactive hyperlink selection and diagramming application 220 for providing a starting uniform resource locator (URL) of a given web site, web page, or hyperlink. The arrow 250 is representative of the provision of the starting URL or search scope to the hosted web browser control 230. As will be described in detail below, in addition to a starting point within a web site for beginning interactive hyperlink selection and diagramming, a user may define a scope of search whereby only web pages and links traversed by the user are mapped and diagrammed, or whereby all web pages and links at a given discovery level traversed by the user are mapped and diagrammed.

Referring still to FIG. 2, the arrow 260 is representative of web pages and hyperlinks found by the hosted web browser control 230 based on user selection that are returned to the interactive hyperlink selection and diagramming application 220. The arrow 270 is representative of a return of information from the interactive hyperlink selection and diagramming application 220 to the web diagramming module 210 including identification of pages and/or links navigated by the user and including information regarding relationships between the starting web site, web pages and/or web links found during a given navigation session by the user. As described below, as the web diagramming module 210 receives information about the web pages and/or web links found during the navigation session, a data structure is created by the web diagramming module for identifying the found web pages and/or links and for establishing relationships that are between. The arrow 280, illustrated in FIG. 2, is representative of utilization of the data structure by the diagramming application 200 for creating and displaying a diagram representative of the data structure created by the web diagramming module 210.

Figure 3:
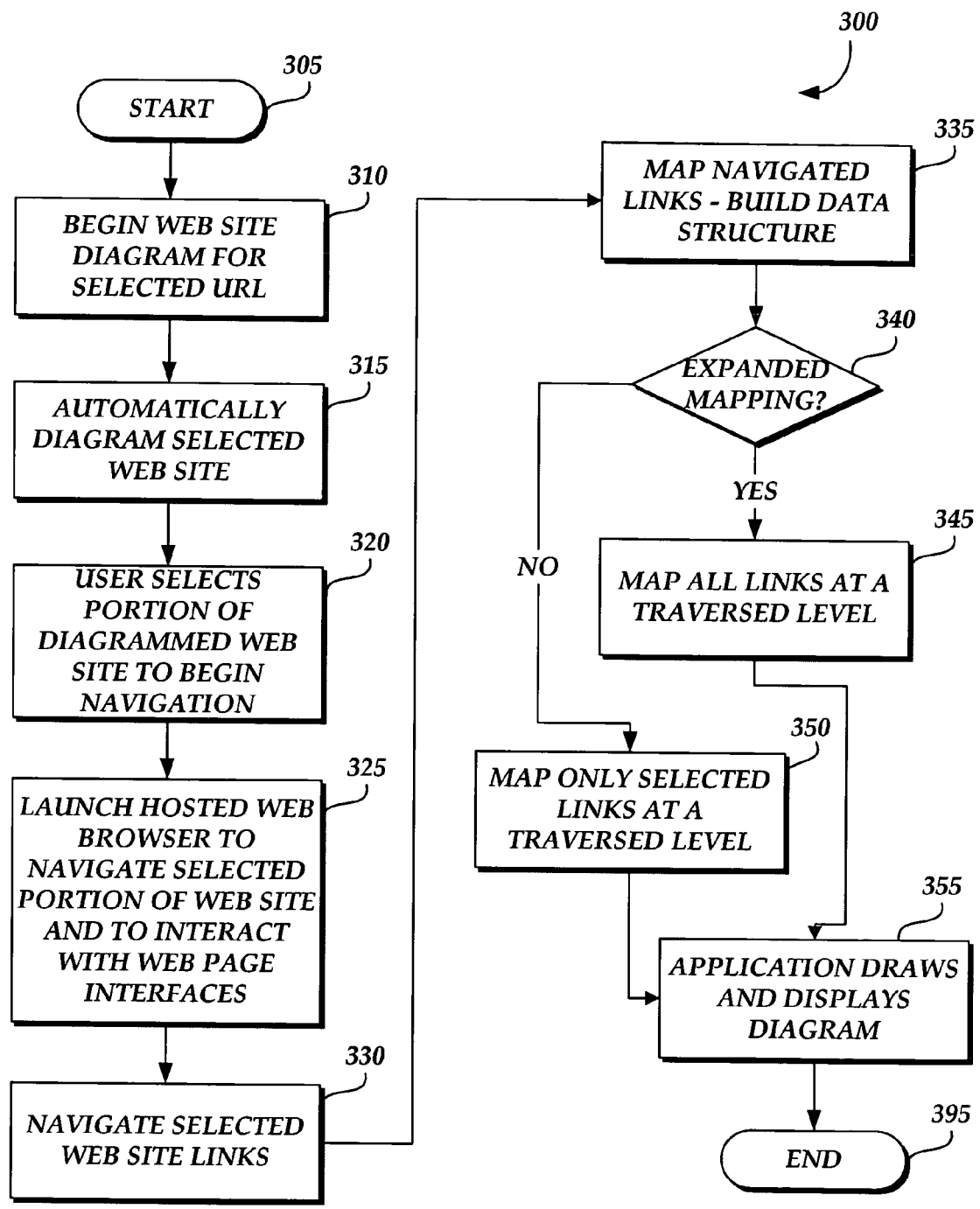
FIG. 3 is a flow diagram showing an illustrative routine for diagramming a web site based on interactive web page and hyperlink selection.

FIG. 3 is a flow diagram showing an illustrative routine for diagramming a web site based on interactive web page and hyperlink selection. For purposes of description of embodiments of the present invention, FIG. 3 is described with reference to FIGS. 2, 4, 5, 6, 7, 8, 9, 10, and 11. Additionally, for purposes of example only, these figures are discussed in terms of an example interactive hyperlink selection and diagramming session where a user utilizes the functionality of the present invention for preparing a diagram of web pages and hyperlinks navigated to by the user while the user navigates from a given web site starting point.

Figure 4:
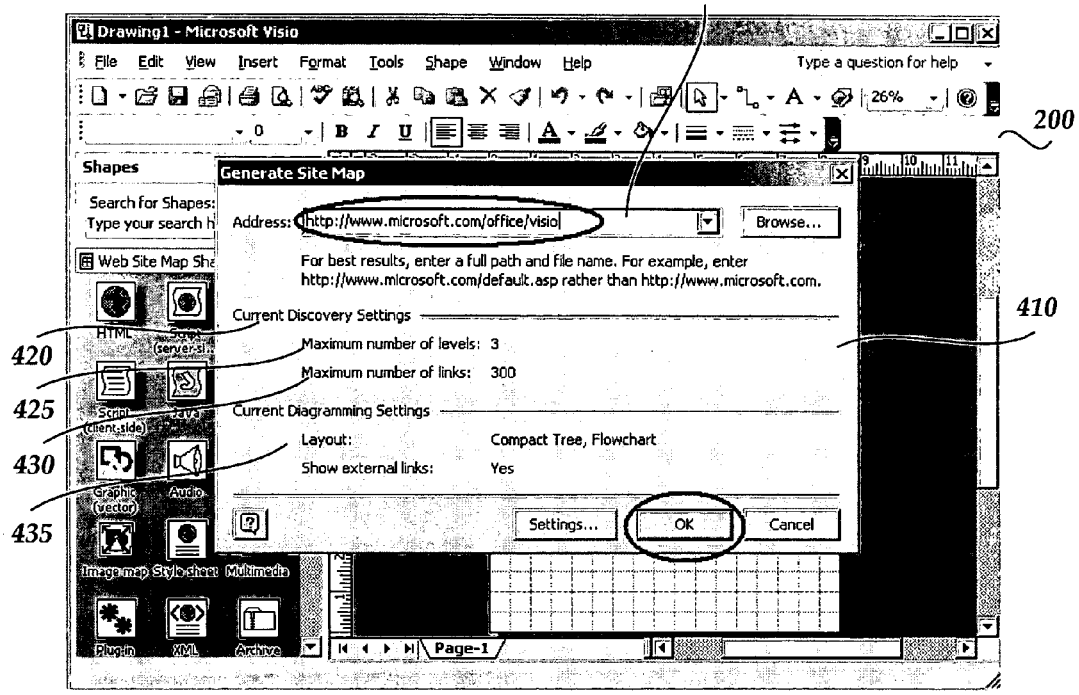
FIG. 4 illustrates a computer screen display showing a web diagramming system according to embodiments of the present invention.

The routine 300 begins at start block 305 and proceeds to block 310 where a user begins a web site diagramming session for a selected web site address, such as a web site uniform resource locator (URL) or uniform resource identifier (URI). At block 310 (and referring to FIG. 4), a user launches the web diagramming application 200, and the user further launches a session of the web diagramming module 210 by opening the dialog 410 for generating a site map of a specified web site. As illustrated in FIG. 4, the dialog 410 allows the user to enter a web site address 415 for a web site in which the user desires to navigate. The dialog 410 includes a current discovery settings section 420 in which the user may specify the number of levels of discovery (web site searching) desired by the user. A maximum number of links setting 425 is also provided to allow the user to specify a maximum number of links to be searched and mapped by the web diagramming module 210. A current diagramming settings section 430 is provided for allowing the user to specify the layout of a diagram to be constructed by the web diagramming module 210 in concert with the diagramming application 200. For example, the diagram may be constructed as a tree view or flow chart according to embodiments of the present invention. At block 310 of FIG. 3, the user enters a desired web site uniform resource identifier (URI) into the address box 415 of the dialog 410. For example, the user may enter a URI such as www.microsoft.com/office/visio if the user desires to navigate and prepare a diagram of the web pages and/or web links contained in or associated with the specified web site address.

At block 315 (FIG. 3), in response to entry and selection of the specified web site address, the web diagramming module 210 automatically parses the web pages and web links contained under the specified web site address and builds a data structure representative of the parsed web pages and/or links. That is, each subordinate level under the selected web site is parsed, and each subordinate level under the immediately preceding subordinate level is parsed, and so on, for building a data structure representative of the structure of the web site. For example, a web site for a book ordering company may have a first subordinate discovery level for all products offered by the company. A next subordinate discovery level under the first subordinate level may include books. Another subordinate discovery level under the first subordinate level may include music. Likewise, a first subordinate level under the books level may include a fiction books level. Another subordinate level under the books level and on the same level as the fiction books level may include a non-fiction books level. Each discovery level in the structure of the web site may include numerous links and data entry areas for user selection and interaction. According to one embodiment of the present invention, a graph and edge data structure is built by the web diagramming module 210 to represent the relationships between web pages and/or links contained under the specified web site address. As should be appreciated, at this point, only those web pages and/or links not requiring user interaction (e.g., link selection or data input) are parsed by the web diagramming module.

Figure 5:
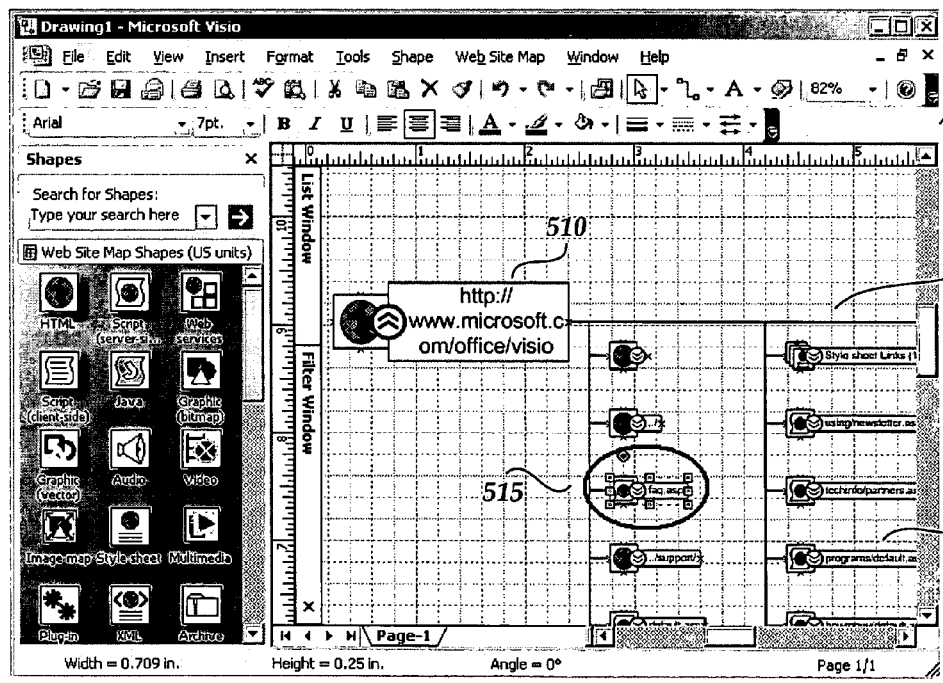
FIG. 5 illustrates a computer screen display showing a diagram of a selected web site according to embodiments of the present invention.

As illustrated in FIG. 5, the data structure created by the web diagramming module 210 is utilized by the diagramming application 200 to create and display a diagram of the selected web site and all web pages and/or links under the selected web site that are accessible by the automated web diagramming module 210. The web diagram 500 is limited by the discovery settings 420 selected by the user in the dialog 410 described above. For example, the selected web site 510 is illustrated in the diagram 500, and web pages and/or links contained under the selected web site 510 are illustrated in tree view form as nodes 515, 520 of the tree view diagram 500.

Figure 6:
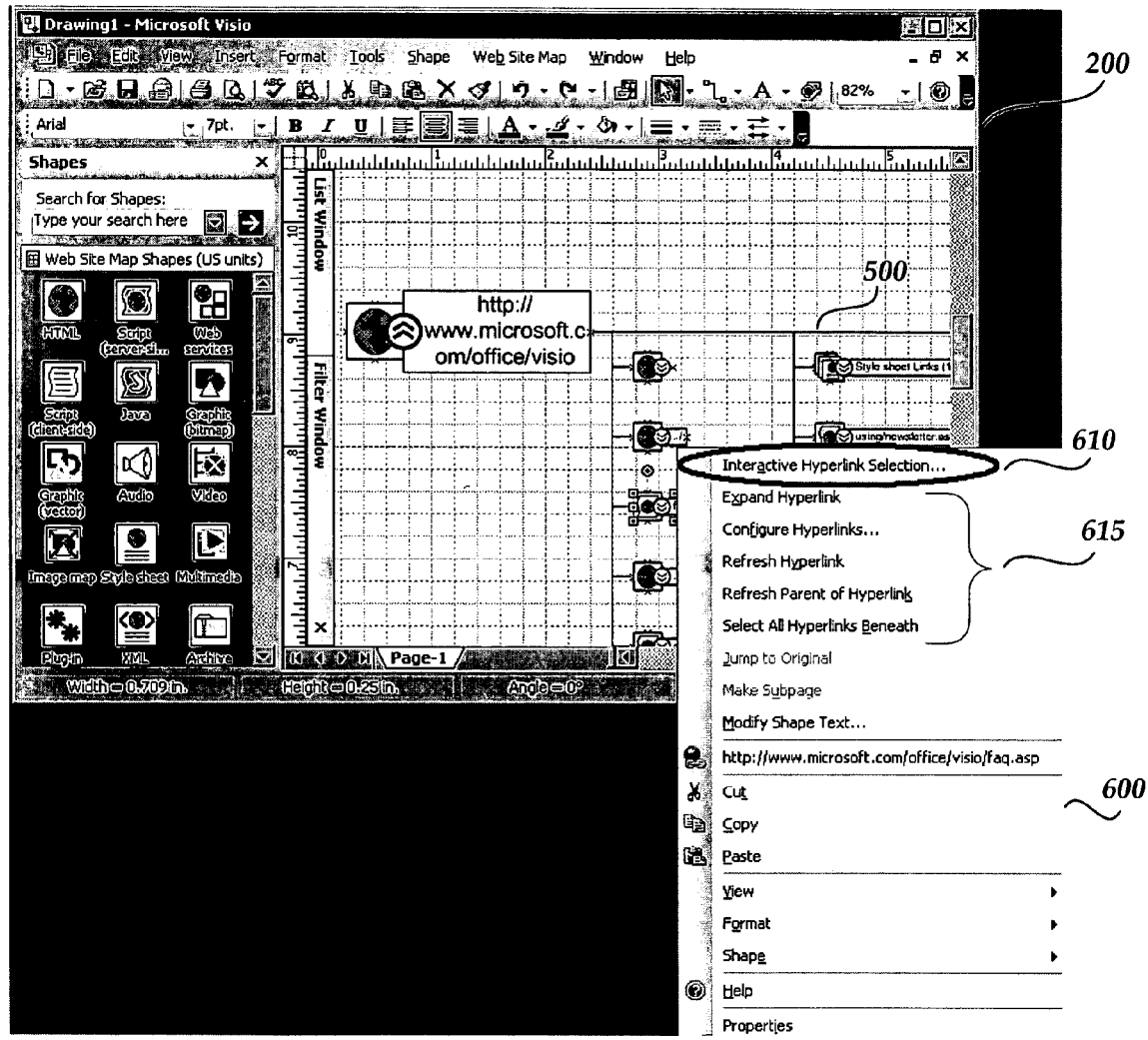
FIG. 6 illustrates a computer screen display showing selection of an interactive hyperlink selection diagramming system and method of the present invention for diagramming a given web site according to user selection and navigation.

Referring back to FIG. 3, at block 320, the user may begin interactive hyperlink selection and diagramming of portions of the selected web site by selecting one of the diagrammed web pages and/or links 515, 520 illustrated in FIG. 5. For example, the user may select the web page 515 to navigate to a web page containing information of interest to the user. For purposes of example, consider that the web page illustrated by the node 515 in the diagram 500 is a web page including "Frequently Asked Questions About Visio." As illustrated in FIG. 6, selection of the web page (node) 515 of the diagram 500 launches a menu 600 for allowing the user to commence an interactive hyperlink selection and diagramming session and for allowing the user to perform other desired actions with respect to the diagrammed information. For example, the user may select the "Refresh Hyperlinks" button 615 to refresh the web diagram 500. For example, if the user deletes one or more nodes 515, 520 from the diagram 500, and the user subsequently desires to replace the deleted nodes, the user may select the "Refresh Hyperlinks" button to cause a refreshed version of the diagram 500 to be displayed containing the previously deleted nodes 515, 520. Following with the present example, the user selects the "Interactive Hyperlink Selection" button 610 to begin an interactive hyperlink selection and diagramming session as described herein.

Figure 7:
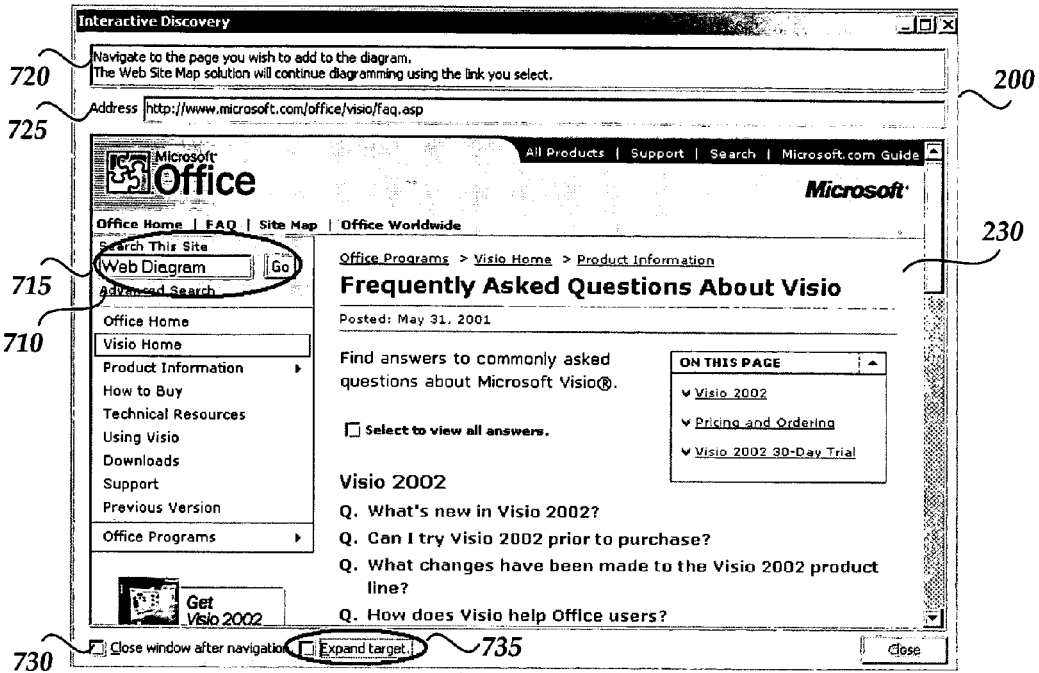
FIG. 7 illustrates a computer screen display showing a hosted web browsing control for navigating selected portions of a web site according to embodiments of the present invention.

At block 325 (FIG. 3), selection of the "Interactive Hyperlink Selection" button 610 launches the hosted web browser control 230 by the web diagramming application 200. As illustrated in FIG. 7, the hosted web browser 230 is launched by the web diagramming application 200 to provide the user a displayed version of the hosted web browser control 230 so that the user may browse the selected web site, web page, or web link in a fashion similar to browsing web sites, web pages, and web links using a typical web browsing application. Functionality displayed by the web page via the hosted web browser control such as the search text box 715 and the "Advanced Search" button 710 comprise functionality provided by the particular web page launched by the hosted web browser control 230. As should be appreciated, the particular web page selected by the user and displayed by the hosted web browser control 230 represents a starting point selected by the user for navigation through the selected web site. Utilizing the web page displayed by the hosted web browser control, the user may browse through other web pages and web links accessible via the starting point web page. That is, using the web browsing control 230, the user may interact with the displayed web page by selecting links contained in the page or by entering data into data text boxes and the like.

Referring still to the displayed web page illustrated in FIG. 7, a text box 720 is illustrated for providing helpful information to the user. An address text box 725 is provided for identifying the address of the presently displayed web page and/or link. Other functionality provided by the diagramming application 200 in accordance with embodiments of the present invention includes the "Close Window After Navigation" check box 730 and the "Expand Target" check box 735. If the check box 730 is selected by the user, the window hosted by the web browser control 230 is closed after navigation of the particular web page or link.

The "Expand Target" check box 735 allows the user to expand discovery or search to all web pages and/or links available under the presently selected web page and/or link. Selection of an expanded search causes the web diagramming module 210 to perform an automated web site parsing and diagramming of all web pages and/or links contained at the present discovery level (presently selected web page and/or link) traversed by the user. Thus, a combination of manual selective navigation as caused by the user and an automated web diagramming of all web pages and/or links at a given level may be performed. For example, if desired, the user may obtain a web site mapping and diagram of a navigation course where a single web page or link is diagrammed at a first discovery (navigation or search) level, followed by a diagramming of all web pages and/or links contained on a next discovery level (expanded target mapping for this level), followed by a diagramming of only two selected web pages and/or links of yet a third discovery level, and so on. Accordingly, the user may obtain a web diagram of those web pages and/or links to which the user navigates and of any web pages or links associated with particular web pages or links to which the user navigates.

Figure 8:
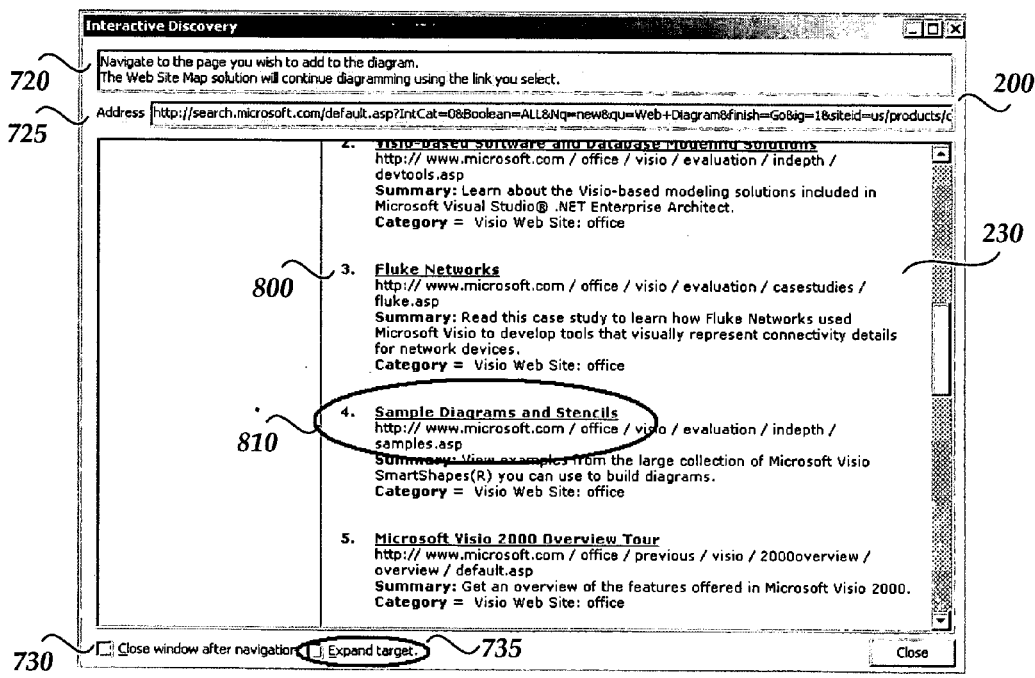
FIG. 8 illustrates a computer screen display showing a hosted web browsing control for navigating selected portions of a web site according to embodiments of the present invention.

At block 330 (FIG. 3), the user begins navigation of the selected web page as displayed by the hosted web browser 230 and as illustrated in FIG. 7. As should be appreciated, the user may browse the selected web page by providing information in a search box, such as the search box 715, or by selecting any web page link provided by the selected and displayed web page. According to the example illustrated in FIG. 7, the user enters the search terms "web diagram" in the search text box 715 to search for additional web pages and/or web links associated with the search term "web diagram." As described herein, other types of user interaction may include provision of authentication credentials requested by a given web page, or selection of a variety of other web page links. As illustrated in FIG. 8, in response to provision of the search term "web diagram" by the user, a second web page is displayed by the hosted web browser control 230. A number of responsive links 800, 810, etc. are provided to the user in response to the search term "web diagram" entered by the user into the text box 715, illustrated in FIG. 7.

Referring still to FIG. 3, the routine proceeds to block 335, where the web diagramming module 210 maps each web page or link selected by the user to a data structure for eventual preparation of a displayed web diagram. According to one embodiment of the present invention, the web diagramming module maps a selected web page or web link to the data structure as the web page or web link is selected. For example, selection of the first selected web page link 515, described above, causes that selected web page link to be mapped to the data structure by the web diagram module. Likewise, selection of any of the links 800, 810, after navigation from the first selected web page, causes the web diagram module 210 to map any of those selected links to the data structure. As described above, if the user had selected the "Expand Target" check box 735 at the search level illustrated in FIG. 7, then each of the links illustrated in FIG. 8 that are responsive to the user's browsing interaction would be mapped to the data structure for eventual diagramming.

At decision block 340, a determination is made as to whether the user has selected expanded mapping. If not, the routine proceeds to block 350 and only those links selected at any traversed discovery level are mapped to the data structure for display in a web diagram. If the user has selected expanded mapping, the routine proceeds to block 345 and all links at a given traversed discovery level are mapped to the data structure. Referring again to FIG. 8, if expanded mapping had been selected, then all links illustrated in FIG. 8 responsive to the user's browsing search would be mapped to the data structure. However, following from the example illustrated in FIGS. 7 and 8, because the user has not selected expanded mapping, only those links selected by the user are mapped to the data structure. For example, if the user selects the link 810 for browsing to additional web pages and/or web links associated with the selected link 810, then at this point in the user's interactive hyperlink selection and diagramming session, only the first selected web page link 515 and the second selected web page link 810 will be mapped to the data structure for web diagramming.

Figure 9:
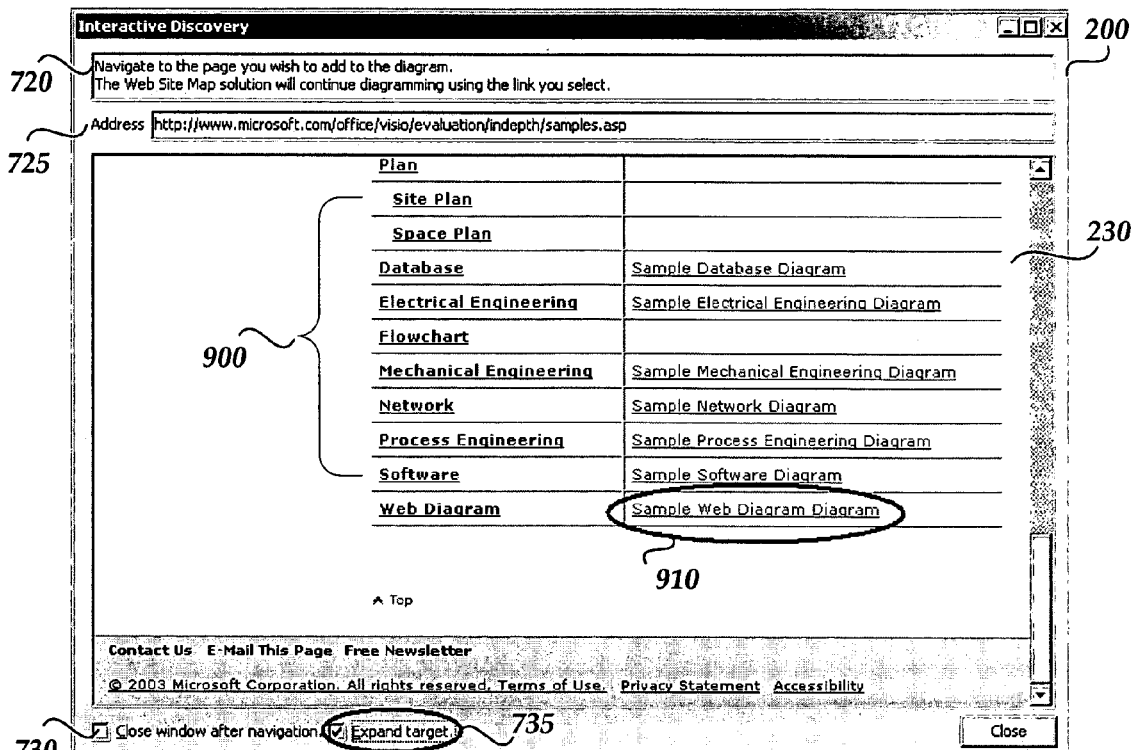
FIG. 9 illustrates a computer screen display showing a hosted web browsing control for navigating selected portions of a web site according to embodiments of the present invention.

Referring now to FIG. 9, a number of web page links responsive to selection of the link 810 are displayed to the user via the hosted web browser control 230. According to the example display illustrated in FIG. 9, the user selects the web page link 910, and the user selects the "Expand Target" check box so that all links responsive to the selected link 910 will be mapped to the data structure. In response to the selection of the web page link 910, a sample web diagram 1000 is presented to the user by the hosted web browser control 230, as illustrated in FIG. 10.

Figure 10:
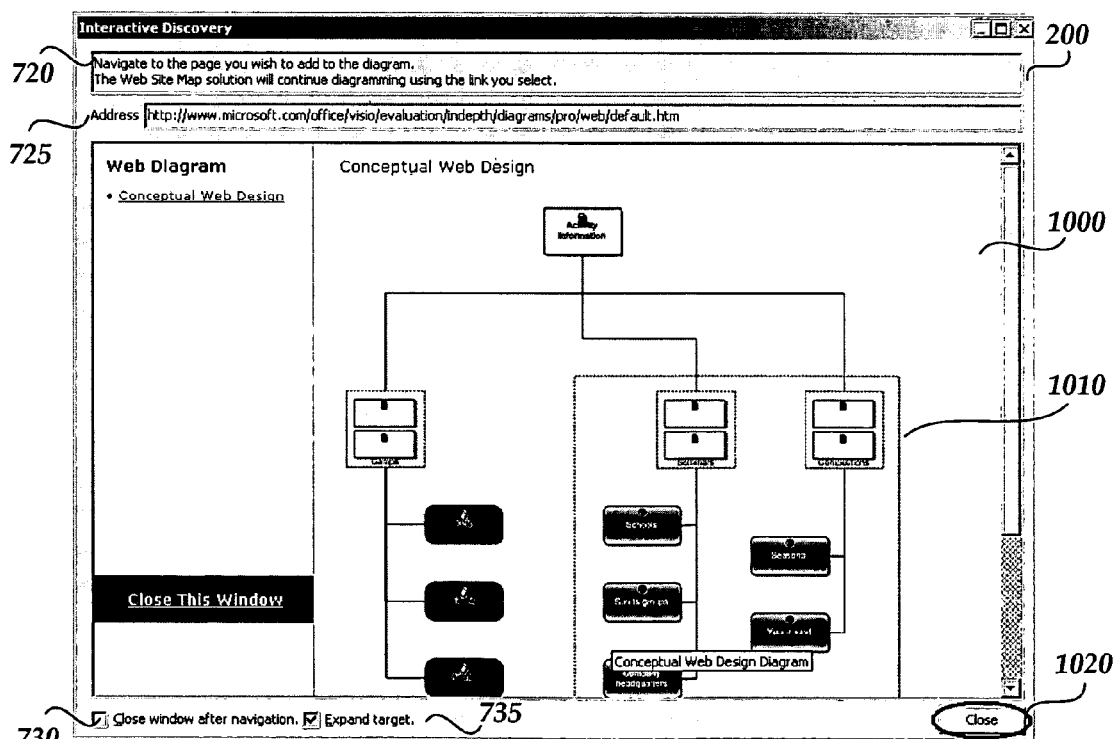
FIG. 10 illustrates a computer screen display showing a hosted web browsing control for navigating selected portions of a web site according to embodiments of the present invention.

According to the web page illustrated in FIG. 10, two links are provided in the web page 1000. For example, a first link "Conceptual Web Design" and a second link "Close This Window" are provided in the web page 1000 responsive to the selection of the web page link 910. Because the user selected the "Expand Target" check box 735, illustrated in FIG. 9, both links illustrated in FIG. 10 are mapped to the data structure by the web diagram module for presentation in the eventual web diagram. According to one embodiment, when the user completes the browsing session, the user may select the "Close" button 1020, illustrated in FIG. 10, to end the interactive hyperlink selection and diagramming session. Depending on the amount of time required for creating an appropriate web diagram, as described below, a dialog may be presented to the user warning the user to wait while the mapping of the user's browsing selections is performed.

Figure 11:
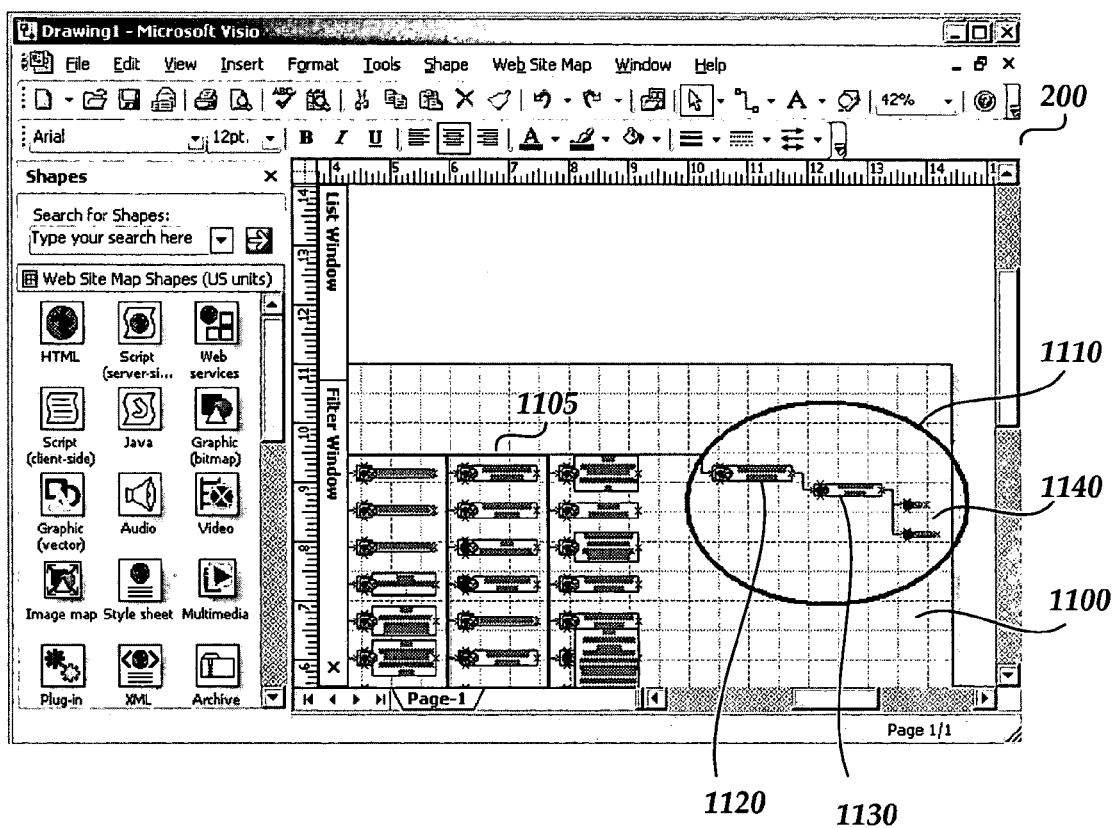
FIG. 11 illustrates a computer screen display showing a diagrammed web site where the sites, pages and/or links selected or navigated are diagrammed.

After all browsing and web page and/or web page link selection is finished by the user, the routine proceeds to block 355. At block 355, the web diagramming application 200 obtains the data structure prepared by the web diagramming module 210 for the navigated web site, web pages and web page links browsed by the user. As illustrated in FIG. 11, a tree view of the navigated web site, web pages, and web links is constructed by the web diagramming application 200 and is displayed to the user. The tree view diagram 1100 prepared and displayed by the diagramming application 200 is representative of all of the web pages and/or web links navigated to by the user under the selected web site address originally entered by the user. The three columns of illustrated web pages and/or web links 1105 are representative of the diagram 500 automatically created by entering the selected web site, as described above with reference to FIGS. 4 and 5 and with reference to block 315 of FIG. 3. To the right of the section 1105 of the diagram 1100 is a first link 1120 which is representative of the selected link 810, illustrated in FIG. 8, and selected by the user in response to browsing from the first selected web page 515. The second link 1130 is representative of the selected link 910, illustrated in FIG. 9, and selected by the user in response to the selection of the link 810. The two of links 1140 are representative of the two links available at the last discovery level traversed by the user after selection of the link 910. Both links 1140 are represented because the user selected expanded mapping when the user selected the web page link 910.

Accordingly, the web diagram 1100, illustrated in FIG. 11, is prepared, diagrammed and displayed by the web diagramming application 200 and provides for the user a mapping of web page addresses and web page links to which the user navigated during the interactive hyperlink selection and diagramming session. Advantageously, the diagramming functionality combines both automated mapping and diagramming for navigation levels selected for expanded mapping and for mapping of individual web page/link addresses to which the user manually navigates through some type of interaction through the hosted web browser. The resulting web diagram is tailored to the web site navigation and mapping desires of the user and allows for diagramming of web pages/links only accessible after manual navigation actions by the user.

As described herein, methods and systems are provided for allowing users to trace a route they take while browsing a web site and to map the route in the form of a web diagram that represents the structure of the web site as navigated or browsed by the user. As described herein, only those links selected by a user may be mapped to a web diagram, or all links at a given traversed discovery level may be automatically mapped to the web diagram. It will be apparent to those skilled in the art that various modifications or variations may be made in the present invention without departing from the scope or spirit of the invention. Other embodiments of the invention will be apparent to those skilled in the art from consideration of the specification and practice of the invention described herein.

We claim:

1. A computer-implemented method for tracking and diagramming navigated portions of a web site comprising:

receiving a selected web site on a web site diagramming application of a client;

on the web site diagramming application, automatically parsing the selected web site for subordinate web pages to the selected website, one of the subordinate web pages being an interaction-required web page, the interaction-required web page requiring user interaction to access a web page subordinate to the interaction-required web page;

on the web site diagramming application, initially mapping web links of the web pages subordinate to the web site including the interaction-required web page to a web diagram data structure of the web site diagramming application, the web links of the web pages subordinate to the interaction-required web page are not initially mapped to the web diagram data structure of the web site diagramming application;

after the initial mapping, receiving a selection of the web link of the interaction-required web page in the web diagram data structure of the web site diagramming application to cause a browser to obtain a web page of the interaction-required web page from a server, the web page of the interaction-required web page being displayed in a user interface of the web-site diagramming application, the user interface of the web-site diagramming application including an expand target selector;

receiving a user input in the displayed interaction-required web page to cause access to the web page subordinate to the interaction-required web page to cause access to the web page subordinate to the interaction-required web page;

in response to causing access to the web page subordinate to the interaction-required web page:

determining whether the expand target selector of the user interface of the web site diagramming application is selected;

when the expand target selector is selected, causing a link to the web page subordinate to the interaction-required web page and links to web pages subordinate to the web page subordinate to the interaction-required web page to be additionally mapped to the initial mapping; and when the expand target selector is not selected, causing only a link to the web page subordinate to the interaction-required web page to be additionally mapped to the initial mapping.

2. The computer-implemented method of claim 1, whereby receiving the selected web site includes receiving an address for the selected web site at the web site diagramming application of the client.

3. The computer-implemented method of claim 1, whereby receiving a selection of the web link of the interaction-required web page includes receiving a selection of a node of the web diagram data structure of the web site diagramming application of the client.

4. The computer-implemented method of claim 1, wherein receiving a user input in the displayed interaction-required web page to cause access to the web page subordinate to the interaction-required web page includes receiving a password input which causes access to the web page subordinate to the interaction-required web page.

5. The computer-implemented method of claim 1, wherein receiving a user input in the displayed interaction-required web page to cause access to the web page subordinate to the interaction-required web page includes receiving a search term input which causes access to the web page subordinate to the interaction-required web page.

6. The computer-implemented method of claim 1, wherein receiving a user input in the displayed interaction-required web page to cause access to the web page subordinate to the interaction-required web page includes receiving a user authentication input which causes access to the web page subordinate to the interaction-required web page.

7. The computer-implemented method of claim 1, wherein receiving a user input in the displayed interaction-required web page to cause access to the web page subordinate to the interaction-required web page includes receiving a hyperlink input which causes access to the web page subordinate to the interaction-required web page.

8. A computer-readable storage medium having computer executable instruction for tracking and diagramming navigated portions of a web site, the instructions comprising:

receiving a selected web site on a web site diagramming application;

on the web site diagramming application, automatically parsing the selected web site for subordinate web pages to the selected website, one of the subordinate web pages being an interaction-required web page, the interaction-required web page requiring user interaction to access a web page subordinate to the interaction-required web page;

initially mapping web links of the web pages subordinate to the web site including the interaction-required web page to a web diagram data structure of the web site diagramming application, the web links of the web pages subordinate to the interaction-required web page are not initially mapped to the web diagram data structure of the web site diagramming application;

after the initial mapping, receiving a selection of the web link of the interaction-required web page in the web diagram data structure of the web site diagramming application to cause a browser to obtain a web page of the interaction-required web page from a server, the web page of the interaction-required web page being displayed in a user interface of the web-site diagramming application, the user interface of the web-site diagramming application including an expand target selector;

receiving a user input in the displayed interaction-required web page to cause access to the web page subordinate to the interaction-required web page to cause access to the web page subordinate to the interaction-required web page;

in response to causing access to the web page subordinate to the interaction-required web page:
  determining whether the expand target selector of the user interface of the web site diagramming application is selected;
  when the expand target selector is selected, causing a link to the web page subordinate to the interaction-required web page and links to web pages subordinate to the web page subordinate to the interaction-required web page to be additionally mapped to the initial mapping; and
  when the expand target selector is not selected, causing only a link to the web page subordinate to the interaction-required web page to be additionally mapped to the initial mapping.

9. The computer-readable storage medium of claim 8, whereby receiving the selected web site includes receiving an address for the selected web site at the web site diagramming application of the client.

10. The computer-readable storage medium of claim 8, whereby receiving a selection of the web link of the interaction-required web page includes receiving a selection of a node of the web diagram data structure of the web site diagramming application of the client.

11. The computer-readable storage medium of claim 8, wherein receiving a user input in the displayed interaction-required web page to cause access to the web page subordinate to the interaction-required web page includes receiving a password input which causes access to the web page subordinate to the interaction-required web page.

12. The computer-readable storage medium of claim 8, wherein receiving a user input in the displayed interaction-required web page to cause access to the web page subordinate to the interaction-required web page includes receiving a search term input which causes access to the web page subordinate to the interaction-required web page.

13. The computer-readable storage medium of claim 8, wherein receiving a user input in the displayed interaction-required web page to cause access to the web page subordinate to the interaction-required web page includes receiving a user authentication input which causes access to the web page subordinate to the interaction-required web page.

14. The computer-readable storage medium of claim 8, wherein receiving a user input in the displayed interaction-required web page to cause access to the web page subordinate to the interaction-required web page includes receiving a hyperlink input which causes access to the web page subordinate to the interaction-required web page.

15. A system for tracking and diagramming navigated portions of a web site, the system comprising:
  a processor;
  a memory having computer executable instructions stored thereon, the computer executable instructions comprising:
  receiving a selected web site on a web site diagramming application;
  on the web site diagramming application, automatically parsing the selected web site for subordinate web pages to the selected website, one of the subordinate web pages being an interaction-required web page, the interaction-required web page requiring user interaction to access a web page subordinate to the interaction-required web page;
  initially mapping web links of the web pages subordinate to the web site including the interaction-required web page to a web diagram data structure of the web site diagramming application, the web links of the web pages subordinate to the interaction-required web page are not initially mapped to the web diagram data structure of the web site diagramming application;
  after the initial mapping, receiving a selection of the web link of the interaction-required web page in the web diagram data structure of the web site diagramming application to cause a browser to obtain a web page of the interaction-required web page from a server, the web page of the interaction-required web page being displayed in a user interface of the web-site diagramming application, the user interface of the web-site diagramming application including an expand target selector;
  receiving a user input in the displayed interaction-required web page to cause access to the web page subordinate to the interaction-required web page to cause access to the web page subordinate to the interaction-required web page;
  in response to causing access to the web page subordinate to the interaction-required web page:
    determining whether the expand target selector of the user interface of the web site diagramming application is selected;
    when the expand target selector is selected, causing a link to the web page subordinate to the interaction-required web page and links to web pages subordinate to the web page subordinate to the interaction-required web page to be additionally mapped to the initial mapping; and
    when the expand target selector is not selected, causing only a link to the web page subordinate to the interaction-required web page to be additionally mapped to the initial mapping.

16. The system of claim 15, whereby receiving the selected web site includes receiving an address for the selected web site at the web site diagramming application of the client.

17. The system of claim 15, whereby receiving a selection of the web link of the interaction-required web page includes receiving a selection of a node of the web diagram data structure of the web site diagramming application of the client.

18. The system of claim 15, wherein receiving a user input in the displayed interaction-required web page to cause access to the web page subordinate to the interaction-required web page includes receiving a password input which causes access to the web page subordinate to the interaction-required web page.

19. The system of claim 15, wherein receiving a user input in the displayed interaction-required web page to cause access to the web page subordinate to the interaction-required web page includes receiving a search term input which causes access to the web page subordinate to the interaction-required web page.

20. The system of claim 15, wherein receiving a user input in the displayed interaction-required web page to cause access to the web page subordinate to the interaction-required web page includes receiving a user authentication input which causes access to the web page subordinate to the interaction-required web page.

21. The system of claim 15, wherein receiving a user input in the displayed interaction-required web page to cause access to the web page subordinate to the interaction-required web page includes receiving a hyperlink input which causes access to the web page subordinate to the interaction-required web page.

* * * * *